United States Patent [19]

Kobayashi et al.

[11] Patent Number: 5,128,703
[45] Date of Patent: Jul. 7, 1992

[54] SHUTTER RELEASE DEVICE

[75] Inventors: Takumi Kobayashi; Etsuro Nishio, both of Tokyo, Japan

[73] Assignee: Asahi Kogaku Kogyo Kabushiki Kaisha, Tokyo, Japan

[21] Appl. No.: 625,063

[22] Filed: Dec. 10, 1990

Related U.S. Application Data

[62] Division of Ser. No. 412,492, Sep. 26, 1989.

[30] Foreign Application Priority Data

Oct. 4, 1988 [JP] Japan ................. 63-130185
Oct. 21, 1988 [JP] Japan ................. 63-137650

[51] Int. Cl.$^5$ .................................. G03B 17/38
[52] U.S. Cl. .................................. 354/266
[58] Field of Search .................. 354/266, 261

[56] References Cited

U.S. PATENT DOCUMENTS

| | | | |
|---|---|---|---|
| 3,481,262 | 12/1969 | Suzuki et al. | |
| 3,623,410 | 11/1971 | Mita | 354/459 |
| 3,950,774 | 4/1976 | Mita et al. | 354/266 |
| 4,085,413 | 4/1978 | Karikawa | 354/137 |
| 4,212,525 | 7/1980 | Erano et al. | 354/266 X |
| 4,500,187 | 2/1985 | Endo | 354/266 |

Primary Examiner—Brian W. Brown
Assistant Examiner—Khanh Dang
Attorney, Agent, or Firm—Sandler, Greenblum & Bernstein

[57] ABSTRACT

A shutter release device for a camera including a shutter release mechanism which is mechanically released. The shutter release device is provided with a release rod which is pushed down to operate a shutter of the camera, a delay member moved by a predetermined distance relative to the release member to release the shutter, a restraint mechanism and a restraint release mechanism. The shutter release mechanism is controlled by the delay member. The restraint mechanism has an engaging leg formed on the delay member and a restraint projection formed on a base plate, and the engaging leg is engaged with the projection to restrain a movement of the delay member. The release restraint mechanism has a release slant formed on the release rod and engaging with the engaging leg to deform the leg so that it is released by the restraint projection.

5 Claims, 9 Drawing Sheets

DISTANCE MEASURING DEVICE — 34

SHUTTER RELEASE DEVICE

This is a division of application Ser. No. 07/412,492 filed, Sept. 26, 1989 pending.

BACKGROUND OF THE INVENTION

1. Field of the Invention

The present invention relates to a shutter release device for a camera having a mechanical shutter and an automatic focusing device operated by a distance measuring signal transmitted from a distance measuring device. In particular, it relates to a delay mechanism for the camera.

2. Description of the Related Art

In this kind of camera, after operation of the automatic focusing device is completed by depressing the shutter button, if the shutter is not released, a problem such as movement out of focus or camera shake occurs. To avoid the these problems, where a camera is not provided with an electric release device, but with a mechanical release device, the camera must be provided with a device for delaying the release of the shutter until after the operations of the measuring device and the automatic focusing device are completed. A conventional mechanical delay device, however, requires a large mechanism, such as a governor mechanism, which is a hindrance to the miniaturization and reduction of the dimensions of the camera.

Further, this kind of mechanical release device is conventionally assembled in such a manner that an engaging lever is attached to other levers, these levers are rotatably fitted to a support pin, and then end portions of a torsion coil spring are attached to these levers. Further, a screw is threadingly engaged in the support pin to prevent a detaching of the levers from the support pin. This assembling operation is obviously complicated and very cumbersome.

SUMMARY OF THE INVENTION

Therefore, the object of the present invention is to provide a shutter release device in which the size of a delay mechanism is greatly reduced and the mechanism has a simple construction, whereby the cost of the shutter release device is reduced.

Another object of the present invention is to provide an engaging lever device mounted in a shutter release device or the like. The engaging lever provided in the engaging lever, device, and engaged with an engaged lever is easily assembled on a support pin.

According to the present invention, there is provided a shutter release device provided for a camera comprising a release member, a delay member, and a mechanism for mechanically releasing a shutter of the camera. A restraint mechanism, and a restraint release mechanism are also provided. The release member is pushed down to carry out operation of the camera shutter. The delay member is moved by a predetermined distance relative to the release member, and the releasing mechanism is controlled by the movement of the delay member. The restraint mechanism restrains a movement of the delay member when an operation takes place in which the release member is pushed down by a stroke shorter than a predetermined value. The restraint release mechanism releases the restraint imposed by the restraint mechanism to move the delay member and thereby operate the releasing mechanism when the release member is pushed down by a stroke longer than the a predetermined value.

Further, according to the present invention, there is provided a engaging lever supporting device comprising a support pin, an engaging lever, an engaged member, mechanism means for linearly urging the engaged member, and means for rotatably urging the engaging lever. The support pin is provided with a pair of flanges defining a small diameter portion therebetween. The engaging lever is rotatably fitted to the small diameter portion, and is provided with an engaging portion and a notch having an arc shaped portion and a mouth portion connected to the arc shoped portion, which is fitted to the small diameter portion. The engaged member includes a pressed portion engagable with and disengagable from the engaging portion of the engaging lever. The linearly urging means urges the engaged member in a direction in which the pressed portion will engage with the engaging portion of the engaging lever, and the rotatably urging means urges the engaging lever in a direction in which the engaging portion will engage with the pressed portion of the engaged member. The mouth portion extends along a direction in which the engaged member is linearly urged. The rotatably urging means is provided in such a manner that the engaging lever is not disengaged from the small diameter portion of the support pin.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
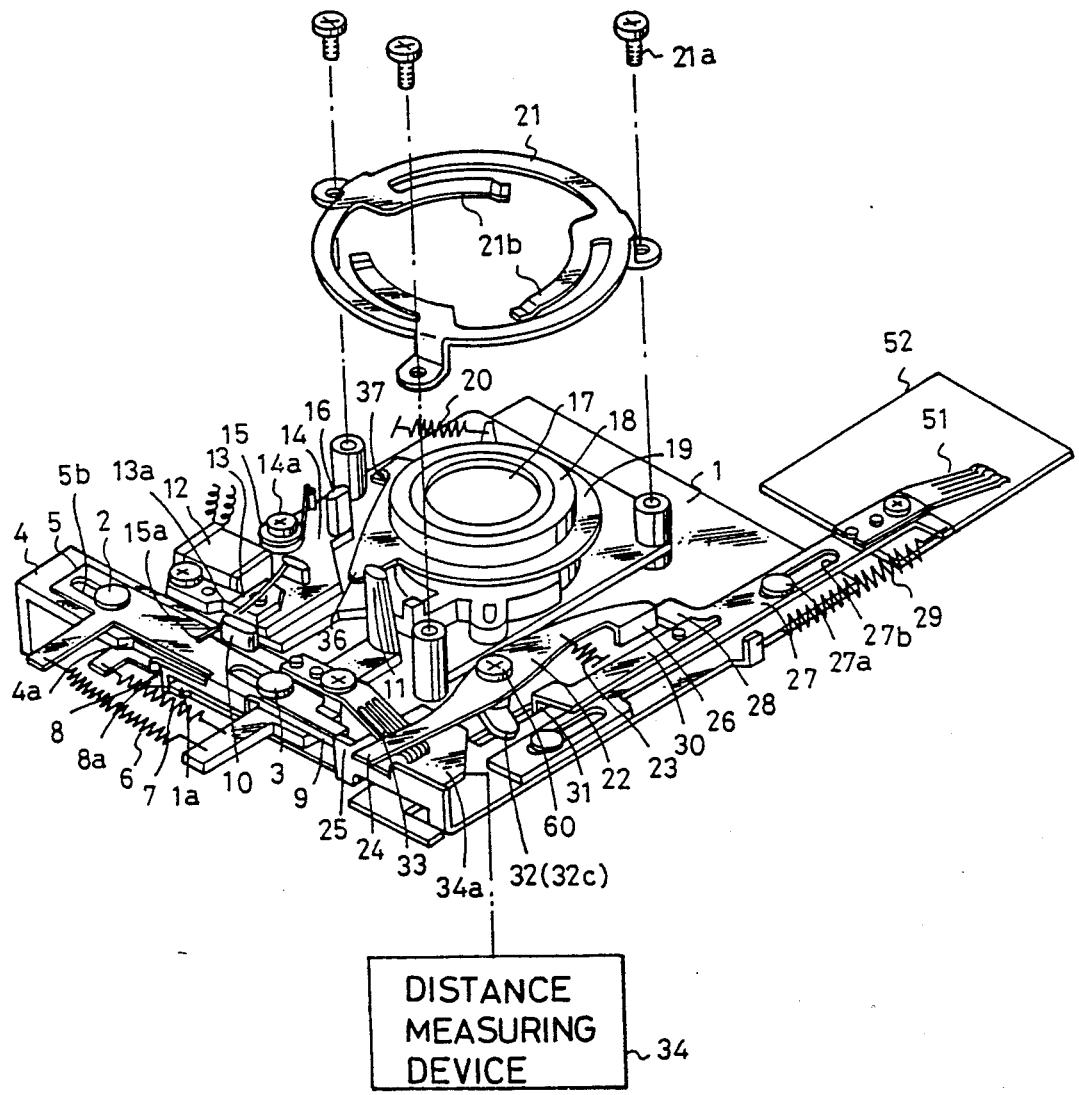
FIG. 1 is a perspective view showing a shutter release device of an embodiment of the present invention.

The present invention will now be described with reference to embodiments shown in the drawings.

The embodiments shown in the drawings are those in which the present invention is applied to a low-price camera in which an automatic focusing device operates in two steps, i.e., for a short distance focal length and for a long distance focal length.

FIGS. 1 through 5 show a first embodiment of the present invention.

FIG. 1 shows a shutter release device placed on a horizontal plane. A release rod 4 is pushed down by an operator of the camera to operate the shutter. A shutter base plate 1 is provided with guide pins 2 and 3 fixed thereto, and the release rod 4 and a delay member 5 are formed with guide slots 4b and 5b, and overlap each other in such a manner that the guide slots 4b and 5b are aligned with each other. The guide slots 4b and 5b are fitted to the guide pins 2 and 3, so that the release rod 4 and the delay member 5 are guided to move along a line extending along the guide slots 4b and 5b. The delay member 5 can be moved by a predetermined distance relative to the release rod 4. A first spring 7 is provided between the release rod 4 and the shutter base plate 1, so that the release rod 4 is urged in a direction in which the release rod 4 is projected from an edge of the base plate 1 and does not operate a distance measuring device 34 described later. A second spring 6 is provided between the release rod 4 and the delay member 5 so that the delay member 5 is urged toward a releasing mechanism, described later, to operate that mechanism.

An engaging leg 8 having an elasticity is provided on a one side portion of the delay member 5. This engaging leg 8 has an L-shaped engaging portion 8a at the tip portion thereof, and the engaging portion 8a is engagable with a restraint projection 1a formed on an edge portion of the shutter base plate 1. When the engaging portion 8a and the restraint projection 1a are engaged with each other, a movement of the delay member 5 due to the second spring 6 is stopped, so that the delay member 5 does not operate the releasing mechanism. The delay member 5 is provided with a press portion 9, for operating a shutter mechanism described later, at an end portion thereof.

Further, the release rod 4 is formed with a restraint release slant 4a which faces a tip portion of the engaging leg 8 of the delay member 5. The restraint release slant 4a engages with and elastically deforms the engaging leg 8 so that the engaging portion 8a is released from the restraint projection 1a, when the release rod 4 is moved relative to the delay member 5 by a stroke longer than a predetermined value.

The release rod 4 is provided with an automatic focus control projection 10 and a lens drive projection 11 standing on the release rod 4 and connected to a brush 33 sliding on a code plate 34a of a distance measuring device 34. The brush 33 operates the distance measuring device 34, when the brush 33 is slid and reaches a distance measuring point S (see FIG. 3) of the code plate 34a. The construction of the distance measuring device 34 is well known, and therefore, a detailed description thereof is omitted.

A photographing lens 17, a lens frame 18, and a lens operating plate 19 integrally formed on the lens frame 18 are provided on the shutter base plate 1, and one end of a spring 20 rotatably urging the lens frame 18 in a counterclockwise direction in the drawing is attached to the lens operating plate 19. The lens frame 18 is constructed in such a manner that the photographing lens 17 is projected in a initial set state, and if the lens frame 18 is rotated by the spring 20, the photographing lens 17 is retracted. A ring-shape pressing spring 21 is fixed to the shutter base plate 1 through fixing screws 21a. This pressing spring 21 has elastic legs 21b extending along an inside periphery of the spring 21 in such a manner that the elastic legs 21b come in to an elastic contact with an end surface of the lens frame 18 to urge the photographing lens 17 in a direction such that the photographing lens 17 is retracted.

The lens operating plate 19 is provided with an associate arm 36 engagable with the lens drive projection 11 of the release rod 4, and a rotation restraint projection 37 for a short distance; the arm 36 and projection 37 being projected in a radial direction of the lens operating plate 19. The associate arm 36 returns the lens operating plate 19 to the initial set state in accordance with a movement of the release rod 4. Namely, the spring force of the spring 7 imposed on the release rod 4 is larger than the spring force of the spring 20 imposed on the lens operating plate 19, and therefore, when the release rod 4 is not subjected to a operation force, the spring 7 urges the release rod 4 so that the lens driving projection 11 is engaged with the associate arm 36, whereby the lens operating plate 19 is rotated in a clockwise direction in the drawing to hold the photographing lens 17 in the projecting position.

A position of the photographing less 17 during photographing is controlled in two steps, i.e., for a long distance focal length and for a short distance focal length. When the lens frame 18 is rotated in the counterclockwise direction and the rotation restraint projection 37 is engaged with a stopper projection 16 formed on an armature lever 14, a control to the short distance focal length, i.e., a control by which the lens operating plate 19 is rotated by a small rotational angle, is carried out. A control to the long distance focal length is carried out by an engagement of the associate arm 36 of the lens oprating plate 19 with a stopper pin 38 fixed to the shutter base plate 1.

The armature lever 14 is pivotally supported by the shutter base plate 1 through a pin 14a, and an armature 13 is connected to a pin 13a provided on an end portion of the armature lever 14; this end portion being positioned opposite to the stopper projection 16. The armature 13 faces an automatic focusing magnet 12 for switching between the long distance focal length and the short distance focal length. When an electric current is applied to the automatic focusing magnet 12, the armature lever 14 is kept at a position shown in FIG. 2, i.e., a position at which the stopper projection 16 is able to engage the rotation restraint projection 37 of the lens operating plate 19.

A torsion coil spring 15 is wound around the pin 14a, and one leg 15a of the coil spring 15 is engaged with a groove formed in the armature 13, so that the armature 13 cannot be detached from the pin 13a, and the armature lever 14 is urged in a counterclockwise direction in the drawing, i.e., in a direction in which the armature 13 is separated from the automatic focusing magnet 12. The leg 15a is also engaged with the automatic focus control projection 10 of the release rod 4.

The construction of a mechanical shutter is described below, wherein a shutter sector 32 is pivotally mounted on the shutter base plate 1 through a support pin 60, and an end portion of the shutter sector 32 opens and closes an aperture 40 provided at the center of the photographing lens 17. The shutter sector 32 is always urged by a spring 32b in a direction in which the aperture 40 is closed.

A shutter engaging lever 22 is rotatably provided on the support pin 60, and rotatably urged by a spring 23 in a clockwise direction in the drawing, so that a pressed arm 24 provided on the engaging lever 22 is always in contact with a stopper projection 25 formed on the shutter base plate 1. The pressed arm 24 is pressed by the press portion 9 of the delay member 5 when the delay member 5 is moved. A hook portion 26 is provided at the opposite portion of the pressed arm 24 of the shutter engaging lever 22, and engages with an engaging portion 28 of a shutter operating lever 27.

The shutter operating lever 27 is guided by a guide pin 27a fixed to the base plate 1, and a slot 27b formed in the plate 27, to move in a straight line perpendicular to the release rod 4. A shutter release lever 30 is connected to the shutter operating lever 27 in such a manner that one end of the shutter release lever 30 is fixed to the shutter operating lever 27. The shutter release lever 30 is made of an elastic material and has a bent hook portion 31 for striking an operation arm 32c of the shutter sector 32 at the other end of the shutter release lever 30. Although the shutter operating lever 27 is linearly urged by a spring 29 in a direction in which the hook portion 31 strikes the operation arm 32c, or the engaging portion 28 engages with the hook portion 26 of the shutter engaging lever 22, the engaging portion 28 is usually engaged with the hook portion 26, and thus movement of the shutter operating lever 27 is restrained. The spring force of the spring 29 is much larger than that of the spring 32b. A brush 51 disposed at an end portion of the shutter operating lever 27 comes into contact with a code plate 52 of a shutter control circuit, so that a shutter condition is detected by the code plate 52.

The operation of the shutter release device is described below with reference to FIGS. 2 through 5.

Figure 2:
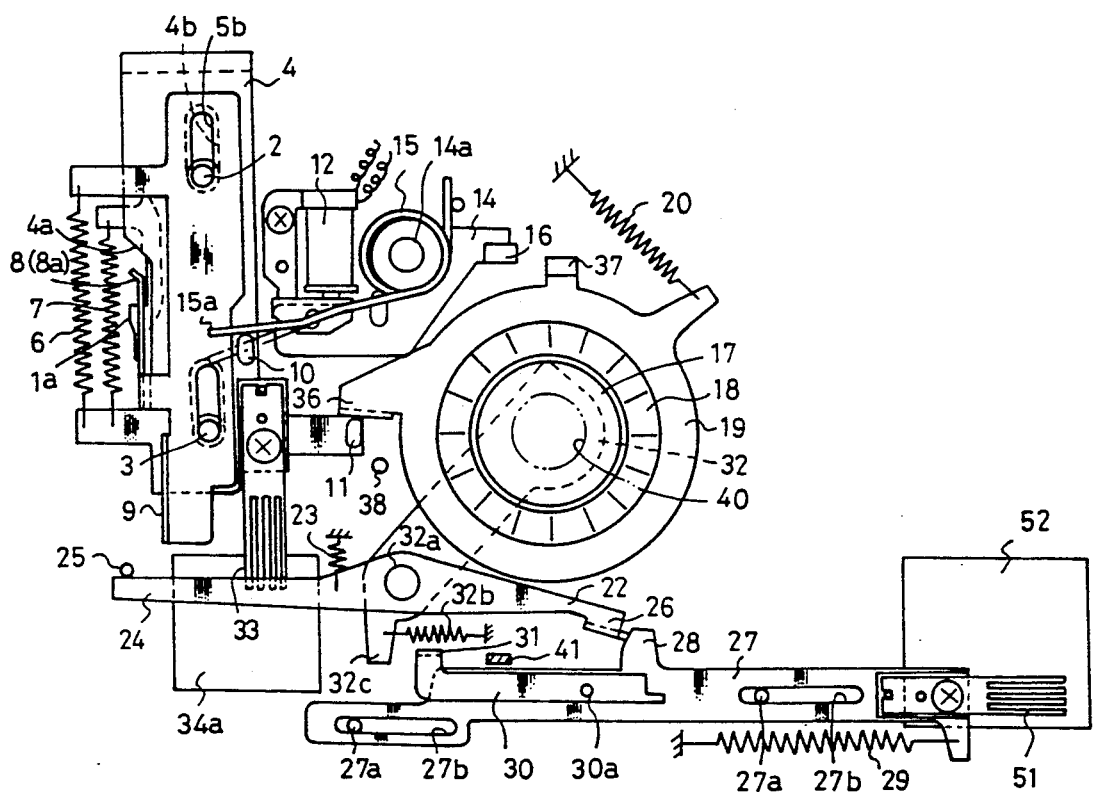
FIG. 2 is a front view of the shutter release device in a state in which a shutter is set to an initial position.

FIG. 2 shows a state in which the shutter release device is in the initial set condition. In this drawing, the release rod 4 is urged by the spring 7 to be positioned at the upper end position in the drawing, and the delay member 5 is urged by the spring 6 to be also positioned at the upper end position in the drawing. The lens drive projection 11 of the release rod 4 rotates the lens operating plate 19 in a clockwise direction through the associated arm 36, so that the photographing lens 17 is held at the initial position. The automatic focus control projection 10 of the release rod 4 rotatively urges the armature lever 14 in a clockwise direction through the leg 15a of the torsion coil spring 15 and the armature 13.

Figure 3:
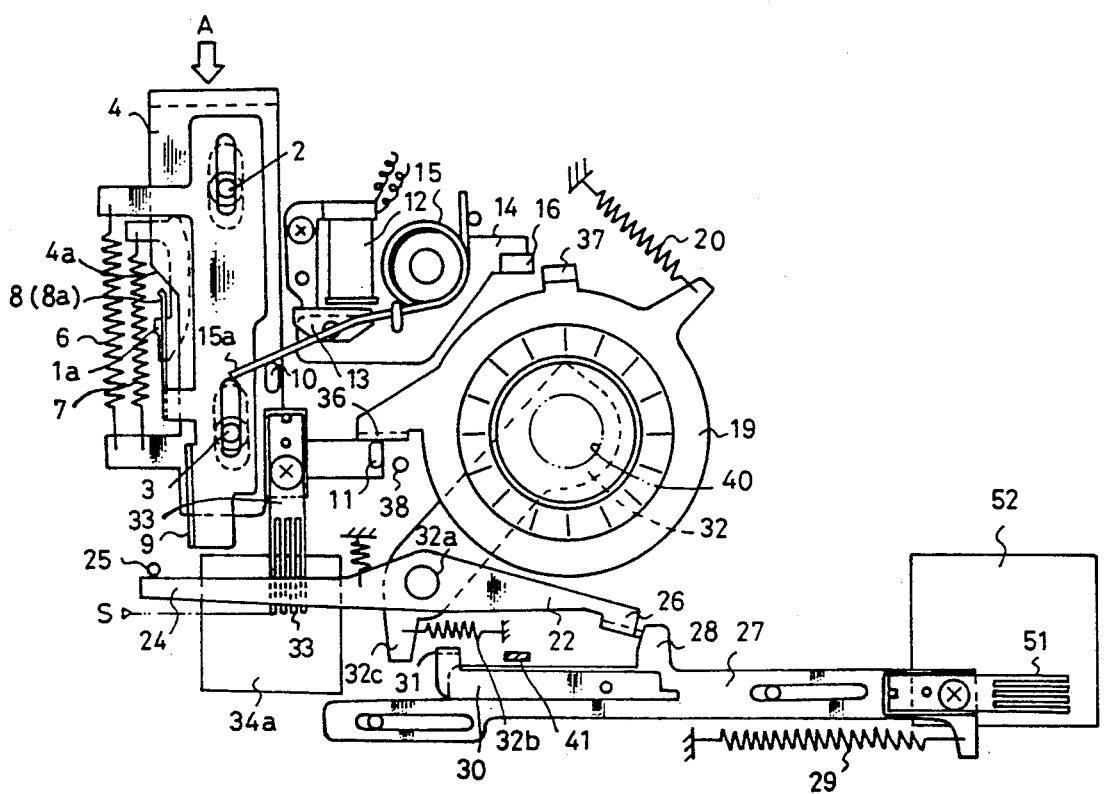
FIG. 3 is a front view of the shutter release device in a state in which a focal length is short.

In the above state, when the release rod 4 is pressed to move in the direction "A" in FIG. 3, i.e., when the shutter button is pressed for one step, the brush 33 passes through the distance measuring line S of the code plate 34, and thus the distance measuring device 34(FIG. 1) is operated. At this time, the leg 15a of the torsion coil spring 15 engaged with the armature lever 14 is engaged with the automatic focusing control projection 10 provided on the release rod 4, so that the armature 13 is kept in contact with the automatic focusing magnet 12. When the lens drive projection 11 of the release rod 4 is moved downward, since the lens operating plate 19 is urged by the spring 20 in a counterclockwise direction, the lens operating plate 19 including the associated arm 36 is rotated in the same direction. Note, the rotation restrain projection 37 of the lens operating plate 19 does not come into contact with the stopper projection 16 of the armature lever 14 at this stage.

During the above operation, the distance measurement is completed, whereby it is determined whether the distance from the camera to the object is a short distance or long distance (more than or less than 3 m, for example). If the object distance is short, an electric current is applied to the automatic focusing magnet 12, and thus that the armature 13 is attracted to the magnet 12. Accordingly, the armature lever 14 is not rotated even if the release rod 4 is moved downward, so that the rotation restrain projection 37 of the lens operating plate 19 comes into contact with the stopper projection 16 of the armature lever 14, and thus the rotation position of the lens operating plate 19 is restrained. This rotation position of the lens operating plate 19 denotes the short distance automatic focusing condition.

Figure 4:
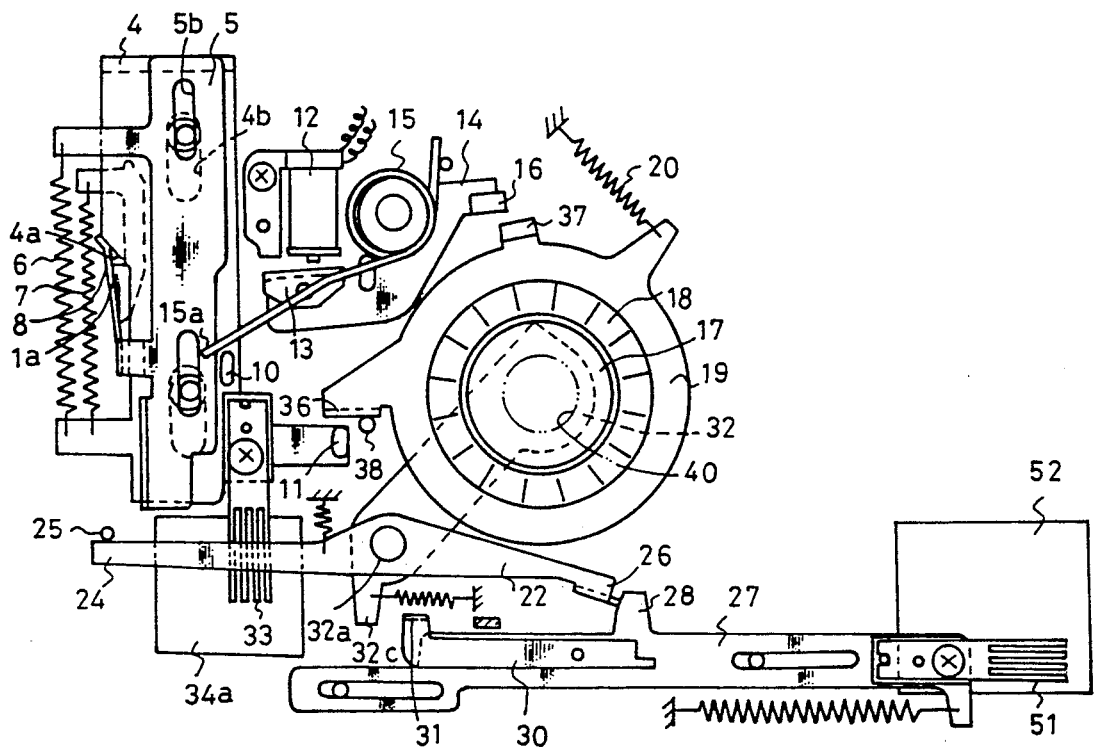
FIG. 4 is a front view of the shutter release device in a state in which a focal length is long.

Conversely, if the distance measuring device 34 determines that the object distance is long, an electric current is not applied to the automatic focusing magnet 12, and therefore, if the release rod 4 is further pushed down as shown in FIG. 4, the automatic focus control projection 10 is moved away from the leg 15a of the torsion coil spring 15 and then, since an electric current is not applied to the automatic focusing magnet 12, the armature lever 14 is rotated in the counterclockwise direction. Further, since the lens drive projection 11 is also moved away from the associated arm 36, the lens operating plate 19 is rotated in the counterclockwise direction until coming to a stop at the position at which the associated arm 36 comes in contact with the stopper pin 38. This condition is the long distance automatic focusing condition.

In the states shown in FIGS. 2 and 3, the delay member 5 is engaged with the restraint projection 1a formed on the shutter base plate 1 and cannot move downward. Namely, the release rod 4 slides or moves relative to the delay member 5, which is stationary, and the spring 6 is stretched to accumulate an elastic energy while only the release rod 4 moves downward.

Figure 5:
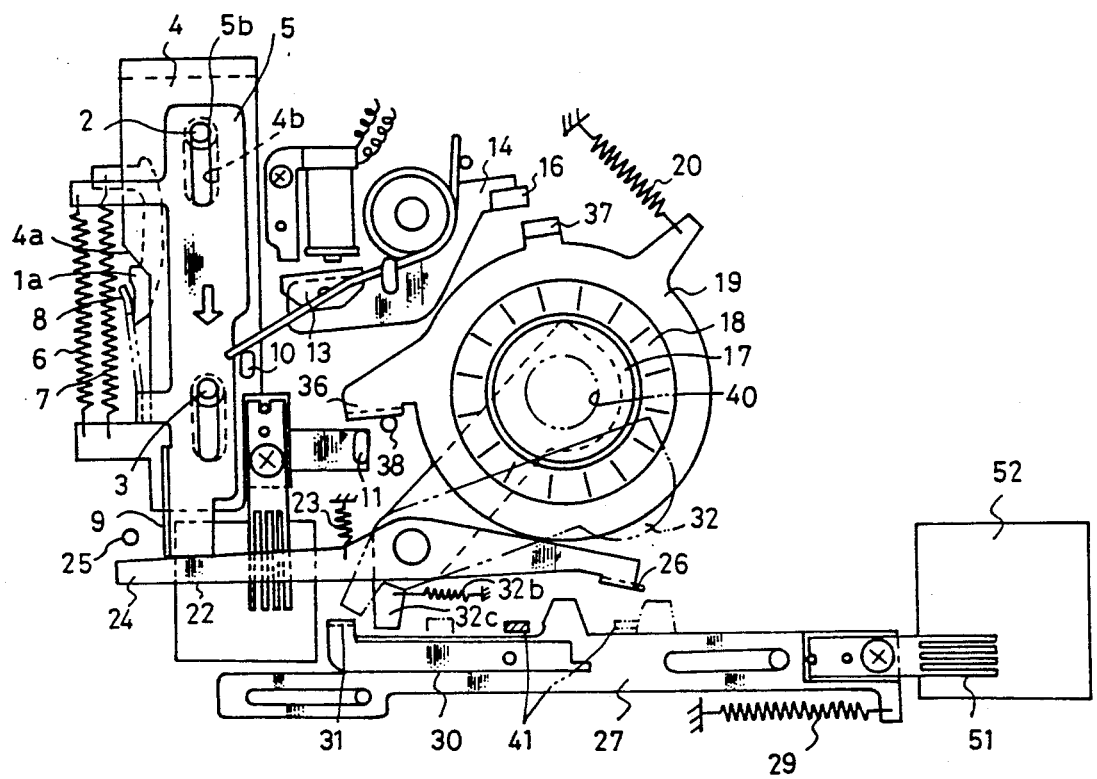
FIG. 5 is a front view of the shutter release device in a state in which the shutter is released.

When the amount of movement of the release rod 4 relative to the delay member 5 exceeds a predetermined value, the restraint release slant 4a of the release rod 4 presses against and deflects the engaging leg 8 as shown in FIG. 4. When the amount of this deflection exceeds a predetermined value, the engaging portion 8a is disengaged from the restraint projection 1a, and the delay member 5 is then moved downward by the spring force of the spring 6 as shown in FIG. 5. This downward movement is carried out after the distance measurement and focusing operations for a short distance and a long distance are completed.

When the delay member 5 is moved downward, the press portion 9 strikes the pressed arm 24 so that the shutter lever 22 is rotated in a counterclockwise direction, whereby the hook portion 26 is disengaged from the engaging portion 28. As a result, the shutter operating lever 27 is moved linearly by the spring force of the spring 29, so that the hook portion 31 of the shutter release lever 30 strikes the operation lever 32c of the shutter sector 32 against the force of the spring 32b. Accordingly, the shutter sector 32 opens the aperture, 40 for a predetermined period and then closes the aperture 40, whereby an exposure is made.

When the operator releases the release rod 4, all of the members except for the shutter operating lever 27 are returned to the state shown in FIGS. 1 and 2, by the forces of respective springs. On the other hand, when the charge member 41 is moved rightward, as shown by a chained line in FIG. 5, by a not shown winding mechanism, the shutter operating lever 27 is restored to the state shown in FIGS. 1 and 2.

Although the above embodiment is applied to a camera in which the photographing lens 17 is stopped for an automatic focusing at two positions, i.e., a long distance focal length and a short distance focal length, respectively, the photographing lens 17 may be controlled by another engaging mechanism to be stopped for an automatic focusing at a plurality of steps, for example, more than 3 steps. Further, although the mechanical shutter shown in the drawings is a constant speed shutter, the embodiment of the present invention may be applied to a construction in which a high-tech mechanical shutter device is operated by the delay member 5.

Still further, in the embodiment shown in the drawings, the spring 6 is provided between the release rod 4 and the delay member 5, and due to this construction, when the release rod 4 is moved relative to the delay member 5, an elastic energy is accumulated in the spring 6. The delay member 5, however, may be urged to be moved independently of the release rod 4, according to the present invention.

As described above, the delay mechanism of the shutter release device of the embodiment of the present invention has a very simple construction, and the shutter is operated only after a distance measurement and an automatic focusing operation are fully completed. Therefore, an excellent shutter release device having a simple construction and a low cost is obtained.

FIGS. 6 through 10 show a second embodiment of the present invention. In this embodiment, only the support mechanism for the shutter engaging lever 22 is different from that of the first embodiment shown in FIGS. 1 through 5, and the remaining construction is basically the same as that of the first embodiment. Note, although the ring-shape pressing spring 21 in FIG. 1 is not assembled to the shutter base plate 1, the ring-shape pressing spring 21 in FIG. 6 can be fixed to the shutter base plate 1 by the screws 21a.

Figure 8:
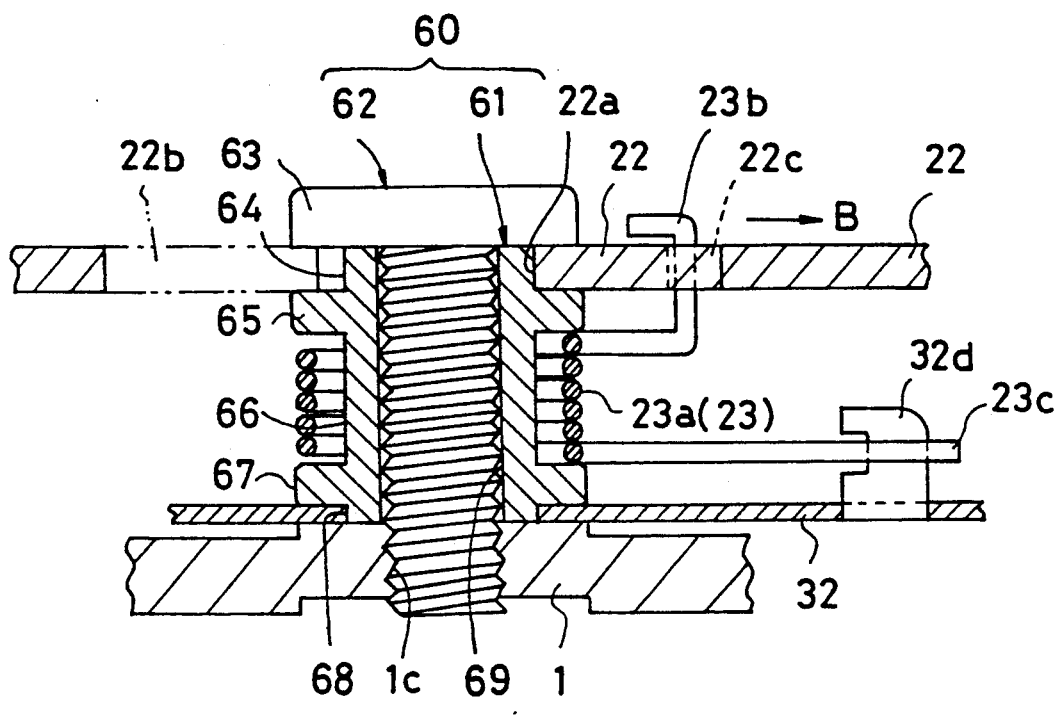
FIG. 8 is a sectional view showing a support pin to which an engaging lever, a shutter sector and a torsion coil spring are connected.

In the second embodiment, the engaging lever 22 is rotatively urged by a torsion coil spring 23 wound around the support pin 60. The support pin 60 has a cylindrical body 61 and a connecting screw 62 fixing the cylindrical body 61 to the shutter base plate 1, as shown in FIG. 8, and is provided with a first flange 63, a first small diameter portion 64, a second flange 65, a second small diameter portion 66, a third flange 67, and a third small diameter portion 68, in that order from the top portion to the bottom portion thereof. Namely, the first small diameter portion 64 is formed between the first and second flanges 63 and 65, and the third flange 67 faces the shutter base plate 1. The connecting screw 62 is inserted into a central hole 69 of the cylindrical body 61, and threadingly fitted in the threaded hole 1c formed in the shutter base plate 1.

Figure 9:
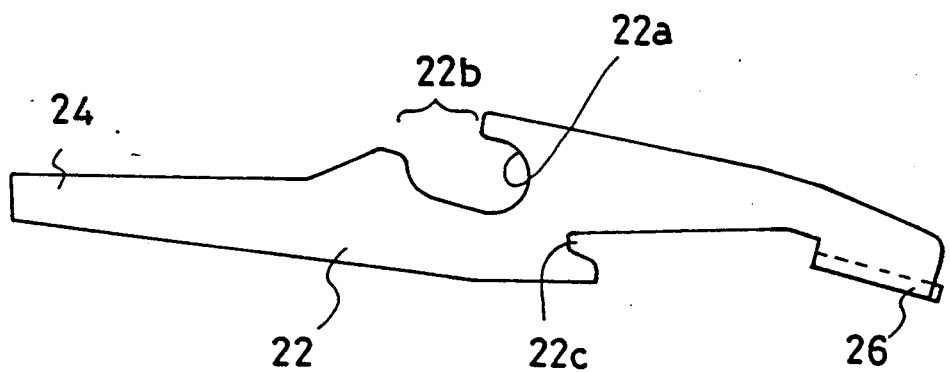
FIG. 9 is a plane view of the engaging lever.

The shutter engaging lever 22 itself is shown in FIG. 9. As shown in this drawing, the shutter engaging lever 22 is provided with a notch having an arc shape portion 22a and a mouth portion 22b connected to the arc shape portion 22a. The arc shape portion 22a is fitted to the first small diameter portion 68, and the mouth portion 22b is open at one end portion thereof and extends substantially in a direction in which the spring 29 urges the shutter operating lever 27. Namely, the shutter engaging lever 22 is assembled and fitted to the support pin 60 in such a manner that the mouth portion 22b is passed through the small diameter portion 64 along the direction perpendicular to the axis of the support pin 60. Namely, the position at which the mouth portion 22b is formed is that at which the shutter engaging lever 22 subjected to a force from the shutter operating lever 27 linearly urged by the spring 29 is not disengaged from the support pin 60 due to that force, and the arc shape portion 22a is in a close contact with the small diameter portion 64 due to that force.

The torsion coil spring 23 rotatively urges the shutter engaging lever 22 in a direction in which the hook portion 26 is engaged with the pressed portion 28, and rotatively urges the shutter sector 32 in a direction in which the aperture 40 is closed. The torsion coil 23 has a coil portion 23a and two leg portions 23b and 23c extending from both ends of the coil portion 23a. The coil portion 23a is wound around the second small diameter portion 66 of the support pin 60. One leg portion 23b located in an upper portion of FIG. 8 is hooked to a spring hook engaging recess 22c formed in the shutter engaging lever 22, and the other leg portion 23c located in a lower portion in FIG. 8 is hooked to a spring hook engaging projection 32d provided on the shutter sector 32. The spring hook engaging recess 22c is provided at the opposite side of the mouth portion 22b about the arc shape portion 22a, and therefore the torsion coil spring 23 also prevents a disengagement of the shutter engaging lever 22 from the support pin 60.

The shutter sector 32 is sandwiched between the shutter base plate 1 and the third flange 67, and fitted to the third small diameter portion 68 to be rotatably supported by the support pin 60.

In the support mechanism described above, the members around the support pin 60 are assembled to the pin 60 as follows. First, the shutter sector 32 is fitted to the third small diameter portion 68 of the cylindrical body 61, and while maintaining this condition, the cylindrical body 61 with the shutter sector 32 is placed on the threaded hole 1c of the shutter base plate 1, and the connecting screw 62 is then threadingly fitted into the threaded hole 1c and fixed therein. Accordingly, the support pin 60 as a whole is fixed to the shutter base plate 1, and thus the shutter sector 32 is completely supported by the support pin 60 and the shutter base plate 1.

Then the torsion coil spring 23 is twisted in such a manner that the diameter of the coil portion 23a is expanded, and is fitted to the second small diameter portion 66 of the support pin 60. Thereafter, the mouth portion 22b of the shutter engaging lever 22 is inserted into the portion between the first and second flanges 63 and 65 of the support pin 60, so that the arc shape portion 22a is engaged with the first small diameter portion 64.

After the shutter engaging lever 22 is connected to the support pin 60 as described above, the leg portion 23b of the torsion coil spring 23 is engaged with the hook engaging recess 22c of the shutter engaging lever 22, and the leg portion 23c is engaged with the hook engaging projection 32d of the shutter sector 32. As a result, due to the torsion coil spring 23, a disengagement of the shutter lever 22 from the support pin 60 is prevented as a first step, and then the hook portion 26 of the shutter engaging lever 22 is engaged with the pressed portion 28 of the shutter operating lever 27, so that a disengagement of the shutter engaging lever 22 from the support pin 60 is further prevented due to the force of the spring 29 in the direction "A" shown in FIG. 7.

Figure 6:
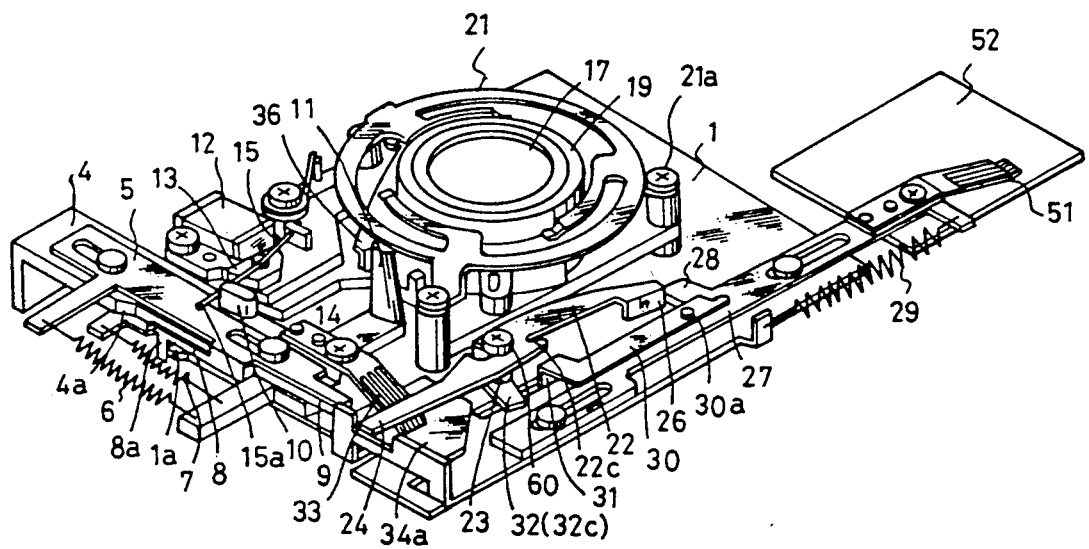
FIG. 6 is a perspective view showing a shutter release device of another embodiment of the present invention.
Figure 7:
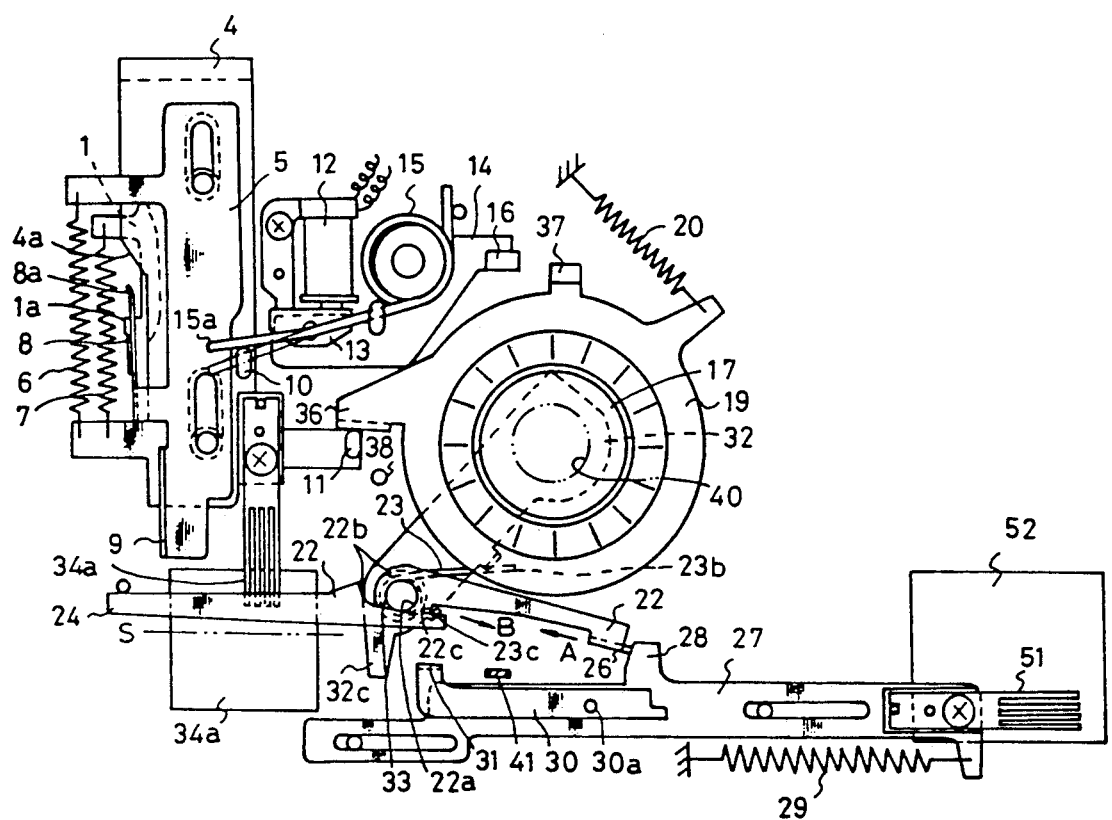
FIG. 7 is a front view of the shutter release device of FIG. 6 in a state in which a shutter is set to an initial position.

After an operation of the shutter, when the shutter operating lever 27 is returned by the charge member 41 to the initial position shown in FIGS. 6 and 7, the shutter operating lever 27 is moved by the spring 29 and the pressed portion 28 is then temporarily engaged with the hook portion 26. Therefore, although the shutter engaging lever 22 is subjected to a force in the direction "B" shown in FIGS. 7 and 8, the torsion coil spring 23 resists this force, and thus a detaching of the shutter engaging lever 22 from the support pin 60 is prevented.

Figure 10:
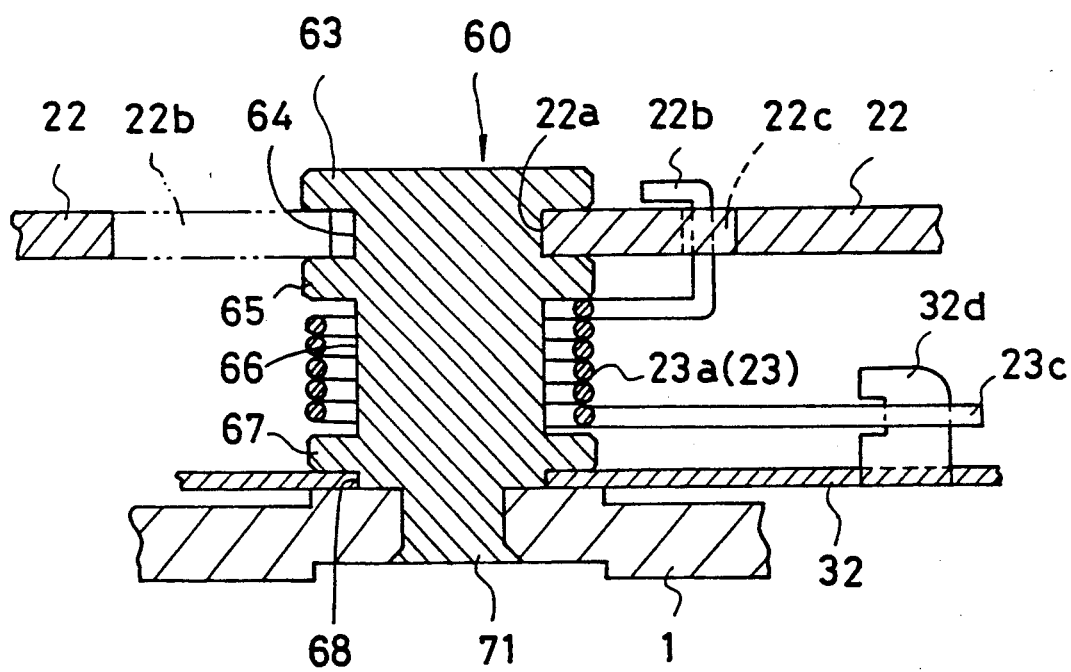
FIG. 10 is a sectional view showing a support pin of a different type to the support pin of FIG. 9.

In the second embodiment, although the support pin 60 is constructed by two members, i.e., the cylindrical body 61 and the connecting screw 61, the support pin 60 can be formed by single member as shown in FIG. 10. Further, as shown in FIG. 10, the support pin 60 can be fixed to the shutter base plate 1 by caulking a lower end portion or caulk portion 71, and thus any kind of connecting means can be used for connecting the support pin 60 to the shutter base plate 1.

As described above, in the supporting mechanism of the present invention, the shutter engaging lever 22 can be assembled to the support pin 60 along a line perpendicular to the support pin 60. Therefore, the engaging lever 22 can be assembled to the support pin 60 after the support pin 60 is fixed to the shutter base plate 1. Accordingly, the assembly of the engaging lever 22 to the support pin 60 is made easier. Disengagement of the engaging lever 22 from the support pin 60 is prevented by an urging force of the engaged member 27 engaged with the engaging lever 22, and the rotatively urging spring 23 for the engaging lever 22. Therefore, the engaging lever 22 is firmly connected to the support pin 60, and no problems arise during the operation of the shutter. Further, since another rotating lever or the shutter sector 32 is provided between the third flange 67 and the shutter base plate 1, the number of parts is reduced, and two kind of levers are rotatably supported by the support pin 60 in a narrow space, which contributes to a miniaturization of a camera.

Although the embodiments of the present invention has been described herein with reference to the accompanying drawings, obviously many modifications and changes may be made by those skilled in this art without departing from the scope of the invention.

We claim:

1. An engaging lever support device for a shutter release device for a camera, said engaging lever support device comprising:

a support pin provided with a pair of flanges defining a small diameter portion therebetween;

an engaging lever rotatably fitted to said small diameter portion, said engaging lever being provided with an engaging portion and notch including an arc shape portion and a mouth portion connected to said arc shape portion, said notch being fitted to said small diameter portion;

an engaged member including a pressed portion engagable and disengagable with and from said engaging portion of said engaging lever;

means for linearly urging said engaged member in a direction in which said pressed portion is engaged with said engaging portion of said engaging lever; and means for rotatably urging said engaging lever in a direction in which said engaging portion is engaged with said pressed portion of said engaged member;

said mouth portion extending along the direction in which said engaged member is linearly urged;

said rotatably urging means being provided in such a manner that said engaging lever does not disengage from said small diameter portion of said support pin.

2. A engaging lever support device according to claim 1, wherein said arc shape portion is fitted to said small diameter portion so that said engaging lever is assembled to said support pin in such a manner that said mouth portion is passed through said small diameter portion along a direction perpendicular to the axis of said support pin.

3. A engaging lever support device according to claim 1, wherein said linearly urging means and said rotatably urging means are springs.

4. A engaging lever support device according to claim 1, further comprising another rotating lever and a base plate to which said support pin is fixed, said support pin being further provided with a third flange facing said base plate, said another rotating lever being rotatably supported between said third flange and said base plate.

5. A engaging lever support device according to claim 4, wherein said rotatably urging means is provided between said another rotating lever and said engaging lever.

* * * * *

UNITED STATES PATENT AND TRADEMARK OFFICE
CERTIFICATE OF CORRECTION

PATENT NO. : 5,128,703
DATED : July 7, 1992
INVENTOR(S) : T. KOBAYASHI

It is certified that error appears in the above-identified patent and that said Letters Patent is hereby corrected as shown below:

On the Cover sheet, inventor (line 75), delete "Etsuro Nishio, both of".
At column 10, line 21 (claim 2, line 1), change "A" to -- -An---.
At column 10, line 28 (claim 3, line 1), change "A" to -- -An---.
At column 10, line 31 (claim 4, line 1), change "A" to -- -An---.
At column 10, line 39 (claim 5, line 1), change "A" to -- -An---.

Signed and Sealed this

Seventh Day of December, 1993

Attest:

BRUCE LEHMAN

Attesting Officer

Commissioner of Patents and Trademarks